United States Patent [19]
Förster

[11] Patent Number: 6,035,979
[45] Date of Patent: Mar. 14, 2000

[54] VIBRATION DAMPER AND A VIBRATION DAMPER WITH A DAMPING VALVE HAVING AN ADJUSTABLE DAMPING FORCE

[75] Inventor: Andreas Förster, Schweinfurt, Germany

[73] Assignee: Fichtel & Sachs AG, Schweinfurt, Germany

[21] Appl. No.: 08/879,158

[22] Filed: Jun. 19, 1997

[30] Foreign Application Priority Data

Jun. 21, 1996 [DE] Germany ............ 196 24 898

[51] Int. Cl.[7] .................................................. F16F 9/34
[52] U.S. Cl. ............................ 188/266.6; 188/322.13
[58] Field of Search .................... 188/266.6, 322.13, 188/266.8, 266.2, 322.2, 322.19, 267, 282.2, 318, 299.1, 282.3, 282.4, 266.5, 313; 701/37–40; 280/5.515; 267/140.14, 140.15

[56] References Cited

U.S. PATENT DOCUMENTS

| | | | |
|---|---|---|---|
| 5,265,703 | 11/1993 | Ackermann ................ | 188/266.6 |
| 5,301,412 | 4/1994 | Hahn et al. ................ | 188/266.6 |
| 5,301,776 | 4/1994 | Beck . | |
| 5,398,787 | 3/1995 | Woessner et al. .......... | 188/266.6 |
| 5,439,085 | 8/1995 | Woessner ................. | 188/266.6 |
| 5,518,089 | 5/1996 | Handke et al. ............ | 188/266.6 |
| 5,558,188 | 9/1996 | Samonil et al. ........... | 188/266.6 |
| 5,651,433 | 7/1997 | Wirth et al. .............. | 188/266.6 |

FOREIGN PATENT DOCUMENTS

| | | |
|---|---|---|
| 0297194 | 1/1989 | European Pat. Off. . |
| 2651289 | 3/1991 | France . |
| 4137821 | 5/1983 | Germany . |
| 3712477 | 4/1987 | Germany . |
| 3823430 | 1/1990 | Germany . |
| 4123141 | 7/1992 | Germany . |
| 9209505 | 11/1992 | Germany . |
| 4243837 | 6/1994 | Germany . |
| 4433436 | 10/1995 | Germany . |
| 3821816 | 10/1963 | Japan . |
| 5519893 | 7/1978 | Japan . |
| 5635877 | 4/1981 | Japan . |

*Primary Examiner*—Douglas C. Butler
*Attorney, Agent, or Firm*—Nils H. Ljungman & Associates

[57] ABSTRACT

A damping valve for a vibration damper including a cylinder filled with damping medium. A piston rod with a piston is realized in the cylinder so that the piston rod can move axially and the piston can divide the cylinder into two working chambers. The damping valve is located inside a housing and is realized so that it can be adjusted by a solenoid in connection with an armature, which armature is guided in an insulator. A receptacle functions as part of the housing, which receptacle, by an insulator, separates the hydraulic part of the damping valve from the electrical part. A tube socket together with the housing holds the adjustable damping valve. As the insulator, at least one gasket or seal is used, which provides hydraulic and magnetic insulation between a cover of the housing and the receptacle.

20 Claims, 7 Drawing Sheets

VIBRATION DAMPER AND A VIBRATION DAMPER WITH A DAMPING VALVE HAVING AN ADJUSTABLE DAMPING FORCE

BACKGROUND OF THE INVENTION

1. Field of the Invention

The present invention relates generally to a damping valve with adjustable damping force. The damping valve includes a cylinder filled with damping medium. A piston rod with a piston is realized in the cylinder so that the piston rod can move axially, and the piston can divide the cylinder into two working chambers. The damping valve is located inside a housing and is realized so that it can be adjusted by means of a solenoid or magnet coil in connection with an armature guided in an insulator. A receptacle functions as part of the housing, which receptacle, by means of an insulator, separates the hydraulic part of the damping valve from the electrical part. A tube socket, together with the housing holds the adjustable damping valve.

2. Background Information

A damping valve is described in German Patent No. G 92 09 505.4, which corresponds to U.S. Pat. No. 5,462,142. On this known damping valve, the housing of the shutoff valve device is connected in a form-fitting manner to the tube socket by means of an encircling bead. This constructive realization of the housing is possible only because a receptacle in which the armature slides, a pole or polarized tube which functions as an insulator and a magnetic core form an assembly. The assembly, in practical terms, forms the cover for the housing because the receptacle, the pole tube and the magnetic core are connected to one another in a hydraulically tight manner by means of soldered connections. One problem with this known construction is that the pole tube must be made of high-grade or high quality steel. It is well known that high-grade steel is very difficult to work. Consequently, the manufacture of the assembly is a complex, time-consuming and expensive process, because the transition between the receptacle and the pole tube may not have any extensions which have a negative effect on the sliding track for the armature.

OBJECT OF THE INVENTION

The object of the present invention is to devise a replacement solution for the pole tube.

SUMMARY OF THE INVENTION

The present invention teaches that this object can be achieved by using as the insulator at least one gasket which provides hydraulic and magnetic insulation between a cover of the housing and the receptacle. One feature of the present invention is that, instead of a complex and expensive pole tube, a known gasket can be used. There is a significant advantage over the known art in terms of the cost of the material required. If the costs saved by the reduced manufacturing operations required are taken into consideration, the result is a significant economic advantage.

In one advantageous embodiment, the present invention teaches that when the housing is assembled, the cover of the housing can be rotated relative to the tube socket. The housing can be rotated relative to the tube socket by opening and closing a locking connection between the housing and the tube socket as desired. During the assembly of the vibration damper, the tight installation spaces inside the fender of the vehicles, in particular the cable set for the solenoid, not only have to be handled carefully, but they must also be installed in a position within strictly defined limits, so that additional components, such as brake lines, can also be installed. To meet this special requirement, the housing of the shutoff valve device can be rotated relative to the housing.

In other words, when the vibration damper is being installed on a motor vehicle, the cable set of the solenoid should be located in a specific position. The cable set of the solenoid should be located in a specific position to permit installation of other components within the confined spaces of the fender of the motor vehicle. The housing of the shutoff valve device can be rotated relative to the tube socket to allow for the installation of the cable set of the solenoid in a specific position.

In an additional advantageous embodiment of the present invention, the receptacle for the solenoid is realized in a cup shape. The number of gaskets to be used can thereby be reduced to a minimum.

In another possible embodiment of the present invention, the receptacle for the solenoid can have a substantially bowl-shaped or pot-shaped design. The receptacle can also be tubular shaped and closed on one end. The receptacle for the solenoid can also preferably have a U-shaped cross section. The bowl-shaped design of the receptacle can reduce the number of gaskets needed for effective sealing of the damping valve.

As disclosed in an additional embodiment, the locking connection includes a circlip. The circlip can be engaged with radial bias in a locking groove. Alternatively, the circlip has at least one actuator tab. The flexible ends or end of the circlip can be introduced into a recess of the housing, so that the circlip can be moved out of the locking groove. Because of the actuator tab which is employed in one embodiment of the present invention, no assembly tools are required to create the locking connection.

In other words, the locking connection can include a retaining ring. The retaining ring can be engaged with a locking groove. The retaining ring could also have at least one actuator tab. The at least one actuator tab can be positioned in a recess of the housing to form the locking connection. When the retaining ring uses at least one actuator tab, no assembly tools are required for the locking connection.

With regard to low losses of magnetic flux which are produced by the solenoid, the cover has an inwardly pointing sleeve segment, which sleeve segment functions as the magnetic return body for the magnetic flux inside the housing. The sleeve segment is in contact with the insulator. The one-piece realization eliminates transmission resistances between the components.

The present invention also teaches that, between the sleeve segment and the armature, there is a gap. The gap can be larger than the clearance between the armature and its bearings inside the housing. The two bearings are designed so that they provide guidance for the armature. The larger gap prevents an excess rigidity of the guidance or makes redundant guidance unnecessary. In addition, the transverse forces which, it is well known, have a negative influence on the friction conditions are reduced.

In other words, the gap between the armature and the sleeve segment can be used to prevent binding of the armature as the armature is moved by the solenoid. The two bearings can be located on opposite sides of the armature to guide movement of the armature.

Depending on the requirements specified for the individual application, the cover can be at least partly connected in a form fitting manner to the receptacle, or can be fixed in position by means of a circlip.

The present invention teaches that it is particularly advantageous if the insulator includes a series arrangement of a first gasket in connection with an insulator as well as a second gasket. The purpose of the insulator is to control the action of the magnetic flux on the armature. For that purpose, the insulator must have a specified height which is a function of the stroke travel of the armature. When one gasket is used, the height of the insulator cannot be selected without restrictions, because the elastic gasket, on account of the bias, is subjected to a cross section deformation which, under some conditions, results in contact between the gasket and the armature. The use of a plurality of gaskets in connection with an insulator located between the gaskets makes possible very large insulator heights which are independent of the cross sections of the gaskets.

The solenoid has a contact surface with the receptacle, which contact surface is offset relative to the insulator. The offset contact surfaces prevent the gasket of the insulator, on account of the bias, from being squashed in a gap between the solenoid and the receptacle. The offset of the contact surfaces between the insulator and the receptacle relative to the solenoid is accomplished by an extension of the solenoid.

In another possible embodiment of the present invention, the magnetic flux generated by the solenoid can force the armature in a downward direction toward the main stage valve. A possible path the magnetic flux can pass is described as follows. First, the magnetic flux can pass in a counter-clockwise direction from the solenoid to the cover and down the sleeve segment. Next, the magnetic flux can be directed to the ring-shaped body by the insulator. The insulator is preferably positioned to deflect the magnetic flux toward the ring-shaped body and to prevent a jump or short circuit of the magnetic flux from the sleeve segment to the receptacle. The application of magnetic flux to the ring-shaped body can cause the ring shaped body to move in the direction of the magnetic flux. Finally, the magnetic flux can pass from the ring-shaped body to the receptacle and back to the solenoid.

In still another possible embodiment of the present invention, there can be a gap between the insulator and the ring-shaped body. The size of the gap between the insulator and the ring-shaped body can influence the length of the insulator required for optimal performance. The insulator should preferably have a length approximately eight times larger than the size of the gap between the insulator and the armature. However, other ratios of insulator length to the size of the gap between the insulator and armature can also produce optimal results.

In yet another possible embodiment of the present invention, the armature can be moved by a stator. The stator can be fixed in place about the armature. The stator can generate a magnetic flux to move said armature. The stator can include a magnetic coil and several housing pieces.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The present invention is explained in greater detail below with reference to the embodiments illustrated in the accompanying drawings, wherein.

DESCRIPTION OF THE PREFERRED EMBODIMENT

Figure 1:
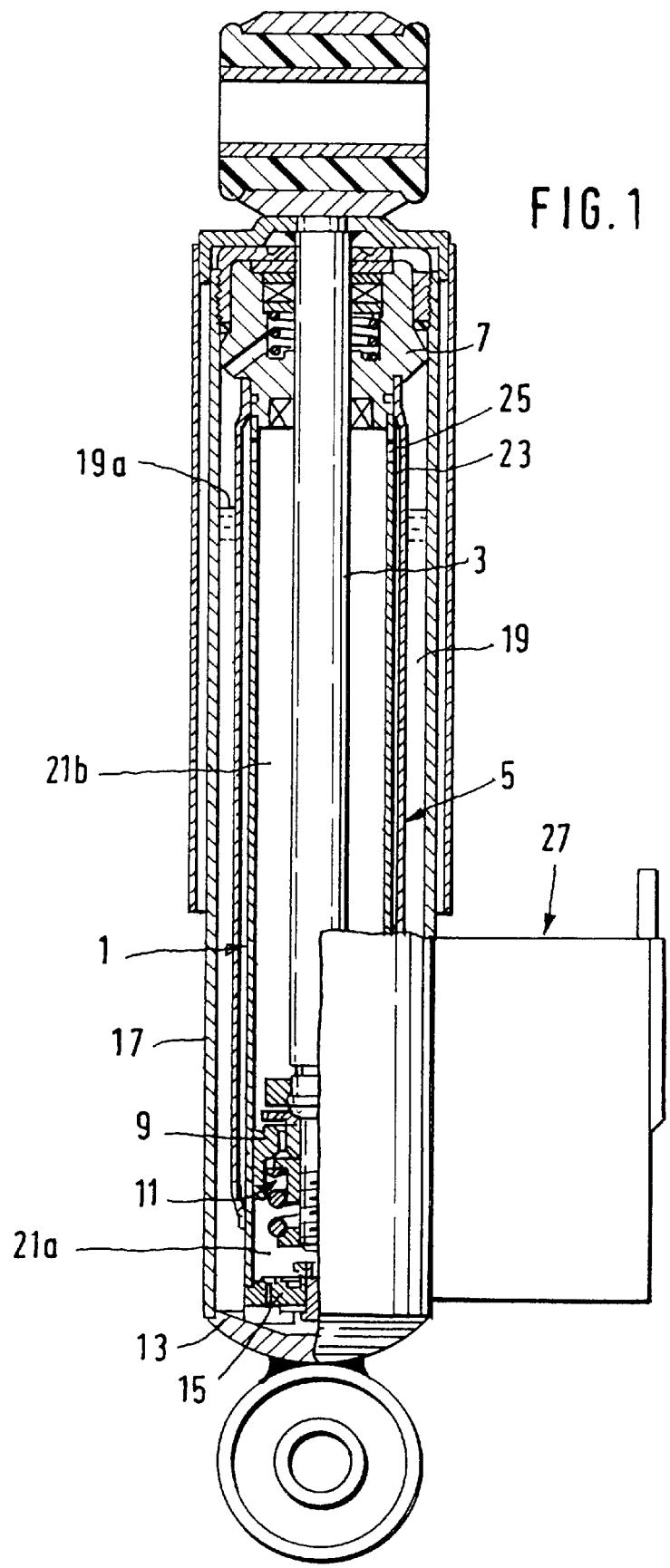
FIG. 1 shows an overall view of a vibration damper.

In FIG. 1, a vibration damper can have a cylinder 1 in which a piston rod 3 is located so that the piston rod 3 can move axially. A guidance and sealing unit 7 can guide the piston rod 3 as it moves out of an upper end of the cylinder 1. Inside the cylinder 1, a piston unit 9 with a piston valve system 11 can be fastened to the piston rod 3. A lower end of the cylinder 1 can be closed by means of a bottom or base plate 13 which has a bottom valve system 15. The cylinder 1 can be surrounded by a reservoir tube or outer tube 17. The reservoir tube 17 and an intermediate tube 5 can form a ring-shaped chamber 19 which represents an equalizing chamber. The space inside the cylinder 1 is preferably divided by the piston unit 9 into a first working chamber 21a and a second working chamber 21b. The working chambers 21a and 21b are preferably filled with hydraulic fluid. The ring-shaped chamber or equalizing chamber 19 can be filled up to the level 19a with fluid and above that with gas. Inside the equalizing chamber 19 there can be a first line segment, namely a high pressure segment 23. The high pressure segment 23 can be in communication via a boring 25 of the cylinder 1 with the second working chamber 21b. Connected to this high pressure segment 23 may be a shutoff valve device 27. The shutoff valve device 27 can be attached laterally to the reservoir tube 17. From this shutoff valve device 27, a second line segment (not shown), namely a low pressure line segment, leads into the equalizing chamber 19.

In other words and in accordance with another possible embodiment, the high pressure segment, high pressure line or high pressure connection 23 can be located between the cylinder 1 and the intermediate tube 5. A boring, hole or passage 25 in the cylinder 1 can provide a passageway for the damping fluid to flow between the second or upper working chamber 21b and the high pressure line 23. The high pressure line 23 is preferably connected to a shutoff valve device 27. The low pressure segment, low pressure line or low pressure connection can connect the shutoff valve device 27 to the equalizing chamber 19.

As the piston rod 3 is preferably moved upward and out of the cylinder 1, the second working chamber or upper working chamber 21b becomes smaller. An overpressure builds up in the upper working chamber 21b, which overpressure can be dissipated by the piston valve system 11 into the first working chamber or lower working chamber 21a, only as long as the shutoff valve 27 is closed. When the shutoff valve device 27 is opened, fluid can flow simultaneously from the upper working chamber 21b through the high-pressure line segment 23 and the shutoff valve device 27 into the equalizing chamber 19. The damping characteristic of the vibration damper as the piston rod 3 is preferably extended therefore depends on the extent to which the shutoff valve device 27 can be open or closed. The shutoff valve device 27 can thereby be adjusted either in discrete stages or continuously.

As the piston rod 3 is preferably inserted into the cylinder 1, an overpressure can be formed in the lower working chamber 21a. Fluid can flow from the lower working chamber 21a through the piston valve system 11 upward into the upper working chamber 21b. The fluid displaced by the increasing piston rod volume inside the cylinder 1 can be expelled through the bottom valve system 15 into the equalizing chamber 19. An increasing pressure can also occur in the upper working chamber 21b, because the flow resistance of the piston valve system 11 is lower than the flow resistance of the bottom valve system 15. If the shutoff valve system 27 is open, this increasing pressure can overflow through the high pressure segment 23 into the equalizing chamber 19. In other words, when the shutoff valve device 27 is open, the shock absorber can have a softer characteristic even when the piston rod 3 is being inserted, and a harder characteristic when the shutoff valve device 27 is closed, and likewise when the piston rod 3 is extended. It should be noted that the direction of flow through the high pressure segment 23 of the bypass is preferably always the same, regardless of whether the piston rod 3 is moving into or out of the cylinder 1.

In another possible embodiment of the present invention, the shock absorber can have a softer characteristic when the shutoff valve device 27 is open and a harder characteristic when the shutoff valve device 27 is closed. The shock absorber can have the above characteristics regardless of whether the piston rod 3 is being inserted into or extended from the cylinder 1.

Figure 2:
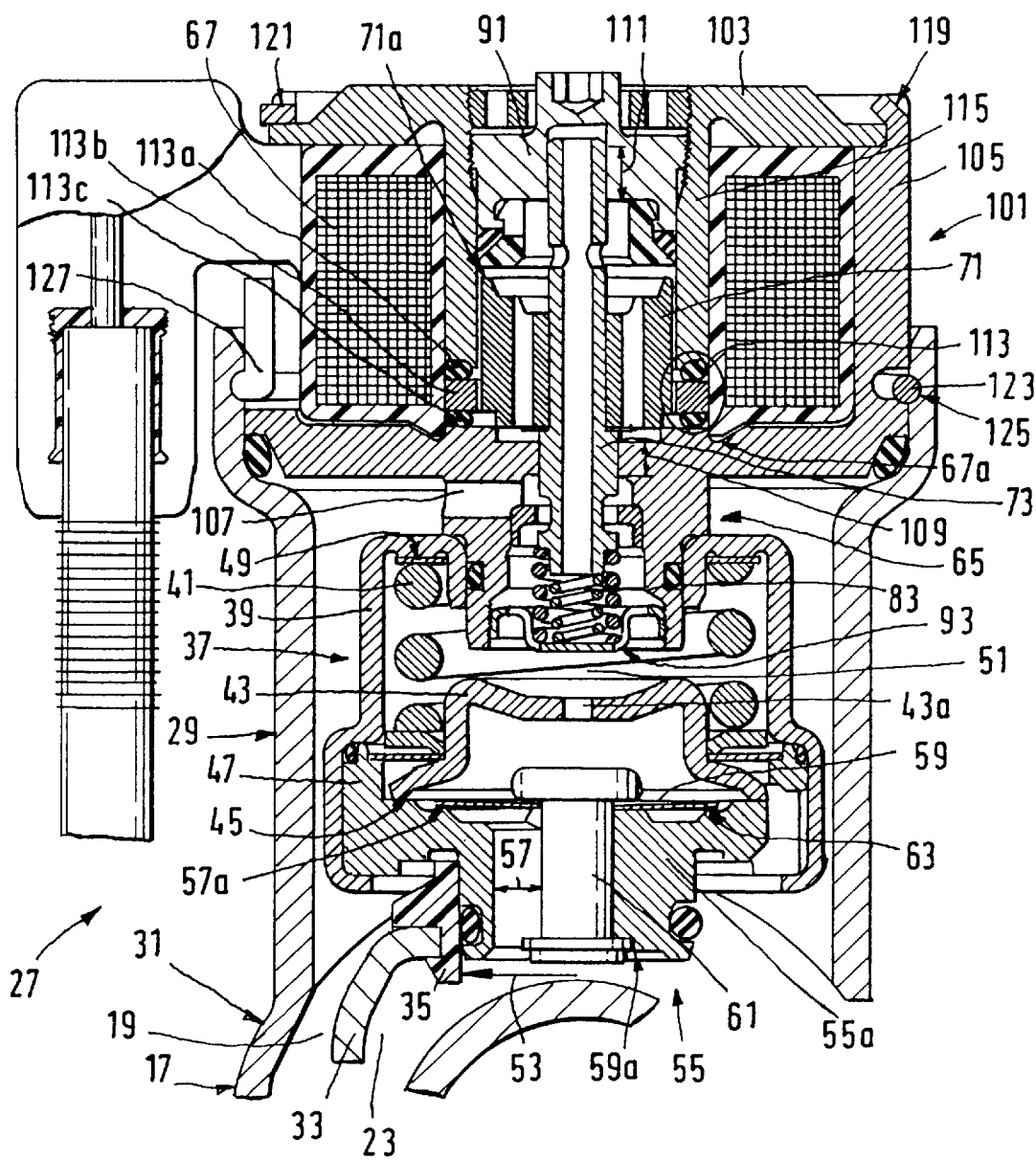
FIG. 2 shows a cross section through a shutoff valve.

FIG. 2 is restricted to an illustration of the shutoff valve device 27. The shutoff valve device 27 may be connected by a pipe socket 29 to a connecting pipe 31 of the reservoir tube 17. The high pressure segment 23 can be formed by the intermediate tube 5. The intermediate tube 5 can have a connecting opening 33 to the shutoff valve device 27. The connecting opening 33 of the intermediate tube 5 can have a cinched intermediate ring 35 which forms an attachment to a main stage valve 37.

The main stage valve 37 can include, inside a main stage valve housing 39, a spring 41. The spring 41 can bias a shutoff valve body 43 against a shutoff valve seat 45. The shutoff valve seat 45 may be a component of a disc body 47 which defines the end of the main stage valve housing 39. The spring 41 can be supported on a rear wall 49 of the main stage valve housing 39. The rear wall 49, the main stage valve housing 39 and the disc body 47 together can form a control chamber 51. The design of the pressurized surfaces on the main stage valve 37 preferably follows the principle that the valve-opening surfaces must be larger than the valve-closing surfaces. Consequently, when the incoming flow to the main stage valve 37 is routed via a central channel 53 inside the intermediate tube 5, a downward movement of the shutoff valve body 43 may always be executed when the spring force of the spring 41 is overcome. The main stage valve housing 39 represents an independent assembly unit which can be subjected to separate inspection and testing.

In another possible embodiment of the present invention, the pressure of the damping fluid in the control chamber 51 and the spring force of the spring 41 can be used to hold the ends of the shutoff valve body 43 against the shutoff valve seat 45. However, the ends of the shutoff valve body 43 can be lifted off the shutoff valve seat 45 by a damping fluid overcoming the bias of the spring 41 and the pressure of damping fluid in the control chamber 51. When the ends of the shutoff valve body 43 are lifted off the shutoff valve seat 45, damping fluid can be bypassed into the equalizing chamber 19.

An admission valve 55 can be located inside the central channel 53. The admission valve 55 can include an admission cross section 57. The admission cross section 57 can be covered by at least one valve disc 59. In FIG. 2, the plane of the section has been cut through an admission cross section 57 and a web 55a of the admission valve 55. A plurality of admission cross sections 57 can be used which are separated by the webs 55a in the admission valve 55. By means of the admission valve 55 in the decompression or rebound direction and in the compression direction, a damping force is produced in a range of velocities of the damping medium in which the main stage valve 37 and/or the pilot valve 65 can be open. The damping force characteristic in this velocity range can have a tendency to rise to a higher damping force, without any additional efforts, arrangements or measures having to be made on the piston valve system 11 and on the bottom valve system 15, because as described above, the shutoff valve device 27 can be active for both directions of movement of the piston rod 3.

Figure 2A:
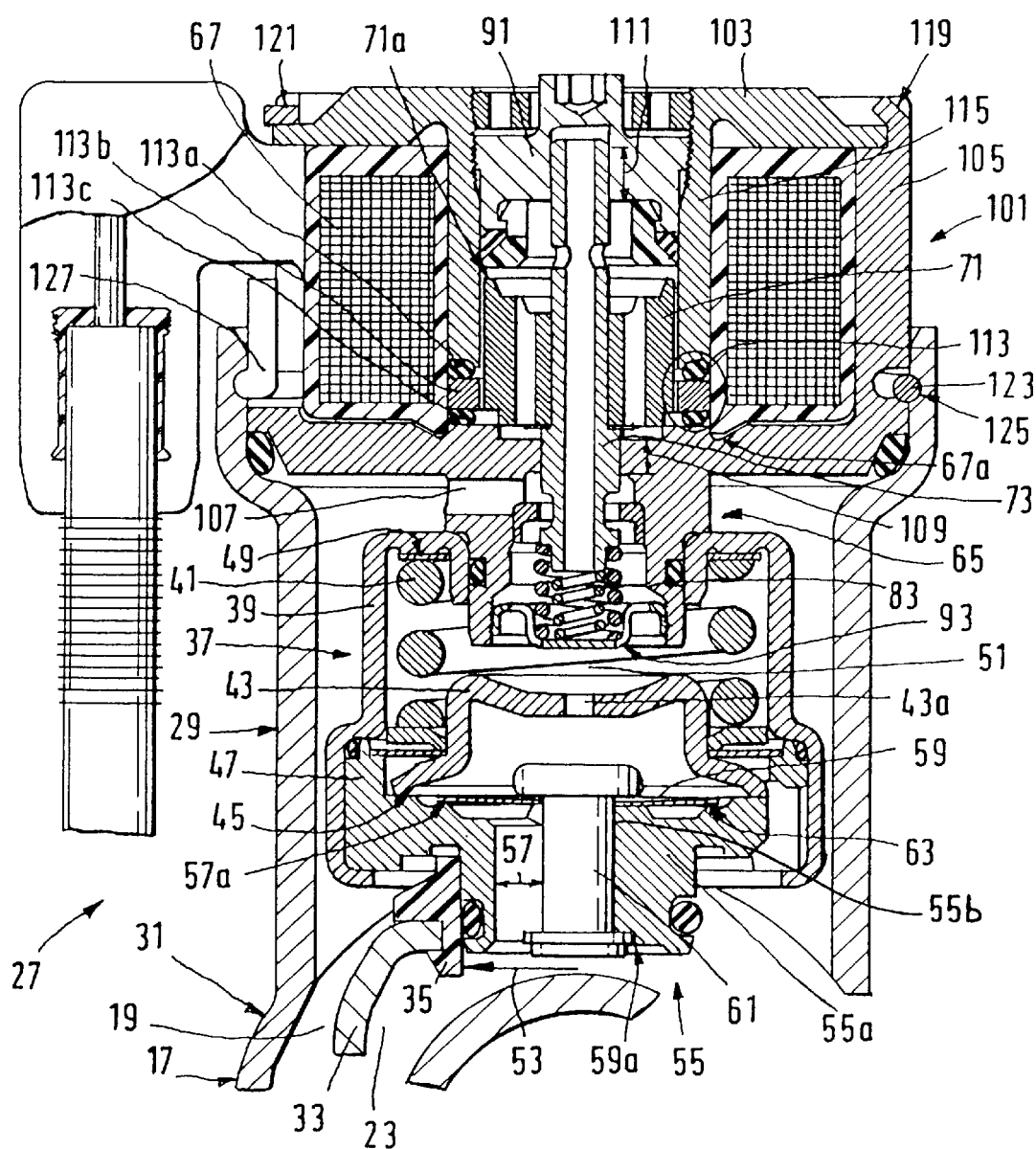
FIG. 2A shows additional features of the shutoff valve of FIG. 2.

The at least one valve disc 59 can be held on the admission valve 55 by a rivet 61. The webs 55a can form an opening 55b (see FIG. 2A) for this purpose. The webs 55a may have no connection in the peripheral direction in the vicinity of the opening 55b. In practical terms, the end surfaces of the webs 55a center the rivet 61. Instead of a rivet 61, a screw can also be used. By changing the deformation or bowing of the at least one valve disc 59, the damping force characteristic of the admission valve 55 can be adapted to meet specific requirements. A pilot opening cross section 57a or a pilot throttle by means of an additional pilot throttle disc 59a can also be realized to create a range in which the damping force characteristic of the admission valve 55 is progressive. For the at least one valve disc 59, a valve seat surface 63 which is independent of the shutoff valve body 43 can be worked into the disc bodies 47.

The main stage valve 37 can be controlled by a pilot valve 65. For this purpose, the damping medium can flow through an opening 43a of the shutoff valve body 43 toward the pilot valve 65. The opening 43a and the admission or inlet cross section 57 can be separated radially from one another, so that the dynamic or impact pressure of the damping medium flowing out of the main stage valve 37 does not act in full on the pilot valve 65.

In another possible embodiment of the present invention, the opening 43a and the inlet cross section 57 can be positioned to be off-center from one another. The opening 43a and the inlet cross section 57 can also be arranged to be substantially non-colinear. The misalignment of the opening 43a and the inlet cross section 57 can be used to prevent the full impact of the pressure of the damping medium flowing through the inlet cross section 57 from acting upon the pilot valve 65.

Figure 3:
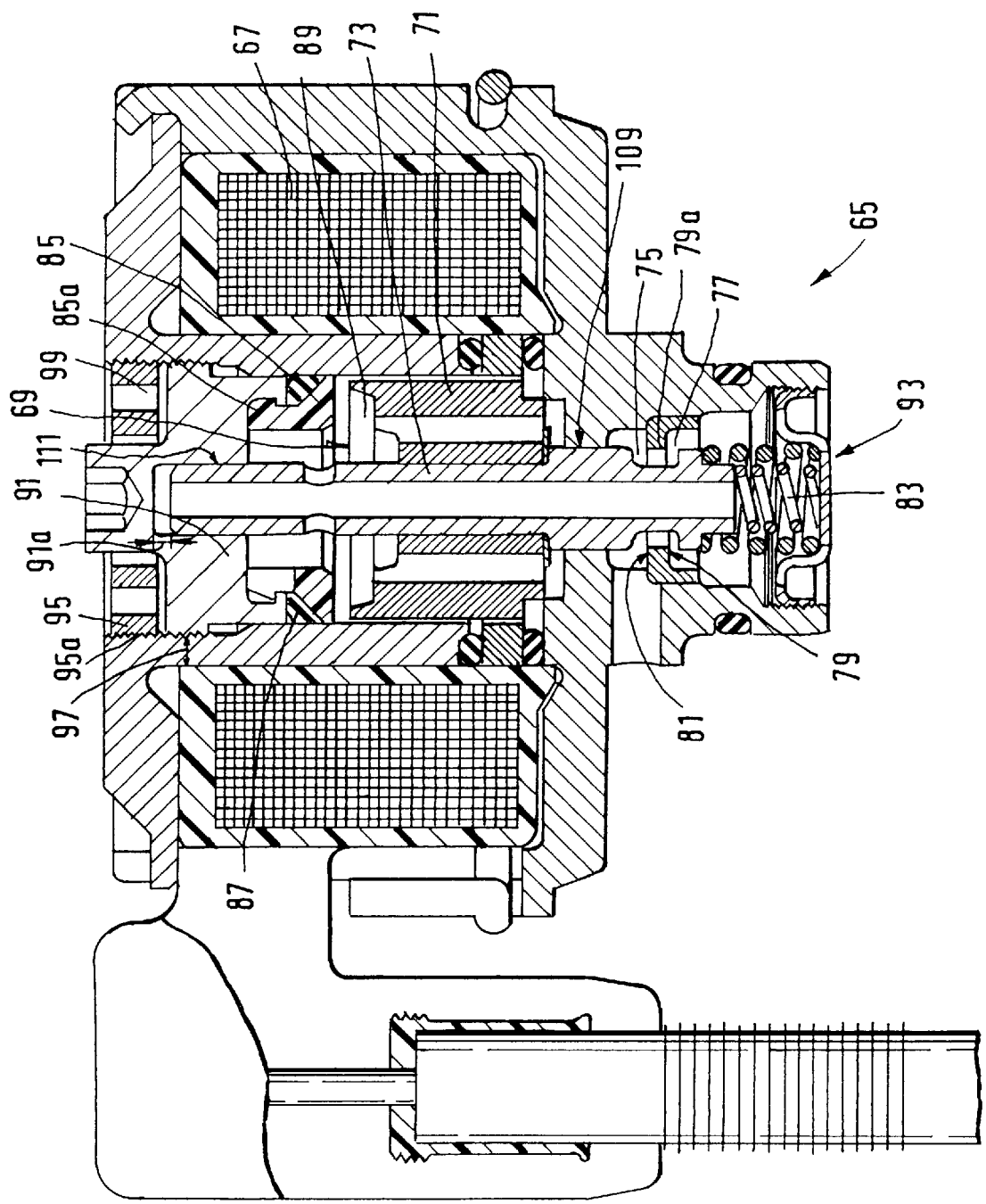
FIG. 3 shows a cross section through the pilot stage valve of the shutoff valve device.

The pilot valve 65 is shown on an enlarged scale in FIG. 3. The setting of the pilot valve 65 can be modified by an actuator in the form of a magnetic coil or solenoid 67 in connection with an armature 69. The armature 69 can include a magnetically conductive ring-shaped body 71, in which ring-shaped body 71 there is a non-magnetic shaft body 73. The shaft body 73 can be realized in the form of a tube, so that the hydraulic pressure on the armature 69 can be considered to be equalized. The pilot valve 65 can be realized on the end of the shaft body 73 facing the main stage valve 37. The pilot valve 65 can have a valve part 75 for normal operation and a valve part 77 for emergency operation of the shutoff valve device 27. The normal operation valve part 75 can optionally be realized in the form of a seat, gate or sliding valve. The emergency operation valve part 77 can be realized in the form of a gate valve and can interact with a control edge 79. The control edge 79 preferably lies opposite a valve seat 81 for normal valve operation. Consequently, the passage cross section of the normal operation valve part 75 must be increased by the extent to which the passage cross section of the emergency operation valve part 77 decreases.

A minimum passage cross section for emergency operation can be defined by a notch 79a in the control edge 79 or in the emergency operation valve part 77. In this regard, it must be taken into account that above a defined magnitude of the passage cross section for the normal operation valve part 75, there is no longer any change in the pilot action or in the effect of the pilot valve. This magnitude is defined by the stroke length or distance. Consequently, the action of the two valve parts 75, 77 can be set independently by means of the stroke length. A spring set 83 can be used which, in this example, can be realized in two parts or pieces. A one-piece spring can also be used, if the spring in question has a non-linear spring rate, i.e. the spring rate increases with increasing spring travel.

In another possible embodiment of the present invention, the stroke length or distance can equal the distance between the normal operation valve part 75 and the emergency operation valve part 77 on the shaft body 73.

In the embodiment of FIG. 3, the above-mentioned non-linear spring rate has been realized by means of two springs. The two springs preferably have significantly different individual spring rates. A longer spring with a lower spring rate is always in contact with the shaft body 73 and can apply a bias to the shaft body 73 against the magnetic force or, in emergency operation, against a stop 85. The shorter spring is preferably active only when the armature 69 is in normal operation. Otherwise, there is no contact between the shaft body 73 and the shorter spring.

In other words, the shorter spring can be in contact with the shaft body 73 during normal operation. However, in emergency operation, the shorter spring preferably does not contact the shaft body 73 because the longer spring has preferably pushed the shaft body 73 away from the shorter spring and against the stop 85.

The stop 85, by means of its position, can define the passage cross section in emergency operation, since the ring-shaped body 71 is supported with its reverse side on the stop 85. The stop 85 can include a non-conducting material which can have a relative permeability of about 1, so that no losses in the magnetic flux occur, and so that the armature 69 does not adhere to the stop 85. Behind the stop 85 there may be a stop seal 87. The stop seal 87 can seal an armature reaction chamber 89 from the environment. The stop 85 is also preferably made of an elastic material.

Behind the stop 85 there may be a set screw 91. The set screw 91 can be adjusted axially with respect to the ring-shaped body 71 by means of a thread together with the stop 85. When the shutoff valve device 27 has been completely installed, the passage cross section can be continuously adjusted for emergency operation by means of this set screw 91, without thereby significantly affecting the normal operation valve part 75, because the valve parts 75, 77 can be separated by means of the stroke in connection with the special or individual springs of the spring set 83. There can be an axial distance 91a between the set screw 91 and the end of the armature 69 closer to the set screw 91. A connection between the set screw 91 and the stop 85, which connection applies a bias to the stop seal 87, can be made by means of snap hooks 85a. Alternatively, a threaded or press-fitted connection can also be used.

To adjust the normal operation valve part 75 there is preferably a spring support plate 93. The axial position of the spring support plate 93 can also be changed by means of a thread. The spring for the emergency operation valve part 77 can also be changed, but as described several times above, such a change has hardly any effect on the valve action of the emergency operation valve part 77 on account of the low spring rate.

As an additional means to set the pilot valve 65 there is a setting or adjustment device, which can be realized in the form of a magnetic control, conducting or guide body 95. The magnetic control body 95 can be located in the vicinity of a magnetic constriction or narrow gap 97. The more the magnetic control body 95 is displaced by means of a thread 95a toward the ring-shaped body 71, the less the magnetic constriction 97 can be effective. As a result of this measure, the magnetic flux and its force on the ring-shaped body 71 can be adjusted against the force of the spring or spring set 83, to compensate for tolerances which can influence the effect of the force on the armature 69.

To improve adjustability, the magnetic control body 95 can have tool surfaces 99 into which an adjustment tool can be introduced. The overall shutoff valve device 27 thereby has three independent adjustment means which can influence the operational response of the pilot valve 65 and thus of the shutoff valve device 27.

The overall shutoff valve device 27, as illustrated in FIG. 2, can be located inside a housing 101. The housing 101 can have, among other things, a cover 103 and a cup-shaped receptacle, holder or mounting 105. The housing 101 can thereby form a part of the return body for the magnetic flux. The force of the magnetic flux can be used to set the armature 69. The receptacle 105 can form a part of the control chamber 51 and a discharge 107 from the control chamber 51 into the equalizing chamber 19. The receptacle 105 can also include the threaded connection for the spring support plate 93 and a first bearing 109 for the shaft body 73. A second bearing 111 can include the set screw 91, which set screw 91 can be screwed into the cover 103. The two bearings 109, 111 can be located far apart from one another in relation to the overall size of the pilot valve 65, so that the centering function of the two bearings 109, 111 can be considered to be extraordinarily effective. The ring-shaped body 71 of the armature 69 can be approximately in the center of the shaft body 73. Unavoidable transverse forces can act uniformly on both bearings 109, 111. Additionally, the diameters of the bearings 109, 111 can be realized as rather small, so that the friction forces remain on a particularly low level.

The forces of the magnetic flux can be oriented to push the armature 69 downward toward the main stage valve 37 against the spring set 83. For that purpose, on the receptacle 105, an optimized transition is realized on the end of the ring-shaped body 71 facing the first bearing 109. So that the effect of the magnetic flux is applied exclusively to the armature 69 and to prevent a magnetic short circuit, an insulator 113 can be located immediately on the receptacle 105 in the vicinity of the first bearing 109. The insulator 113 can be made of a non-conducting material and thus can prevent an overflow or transmission of the magnetic flux from the receptacle 105 to a sleeve segment 115 of the cover 103. Between the sleeve segment 115 and the ring-shaped body 71 of the armature 69 there is preferably a rather large gap 71a, which large gap 71a significantly or clearly restricts the guidance to the two bearings 109, 113. There is preferably no contact between the armature 69 and the sleeve segment 115. For an effective transmission of the magnetic flux, however, there can be a relatively large peripheral surface available on the ring-shaped body 71. The insulator 113 can include, among other things, a first seal or gasket 113c which is oriented toward or with respect to the receptacle 105. The first seal 113c can be adjacent to the actual insulator 113b. The insulator 113 can also include a second seal 113a oriented against or with respect to the sleeve segment 115. Two seals or gaskets 113a, 113c are preferably used, because when a single seal is used, it is possible, on account of the bias applied and the related deformation of the seal, that contact with the ring-shaped body 71 of the armature 69 will occur. The actual insulator 113b can have a smaller inside diameter than the ring-shaped body 71. Therefore contact between one of the seals and the ring-shaped body 71 can be prevented.

In another possible embodiment of the present invention, two seals 113a, 113c can be used to surround the actual insulator 113b. The combined use of the two seals 113a, 113c can preferably prevent one of the seals from coming into contact with the ring-shaped body 71. When a single seal is used, that seal may become deformed and may come into contact with the ring-shaped body 71. To further prevent the two seals 113a, 113c from coming into contact with the ring-shaped body 71, the actual insulator 113b can be designed to have an inside diameter smaller than the inside diameter of the seals 113a, 113c. The actual insulator 113b may also have an inside diameter smaller than the inside diameter of the sleeve segment 115. Finally, the actual insulator 113b can have an inside diameter larger than the outside diameter of the ring-shaped body 71.

The magnetic coil or solenoid 67 has also preferably been adapted to the insulator 113. For example, the magnetic coil 67 can have a lug-shaped extension 67a which guarantees that in no case can the seal 113c be displaced into a hypothetical space between the magnetic coil 67 and the receptacle 105, because the contact surfaces are offset from one another. Changes in the length of the coil 67 or inside the clamping system consisting of the sleeve segment 115 and the insulator 113 as a result of thermal expansion can be compensated for without the formation of a gap.

The overall housing 101 of the shutoff valve device 27 can be held together by a crimp 119 or by a circlip 121. This module can be supported on a shoulder of the pipe socket 29. To axially fix the housing 101 in position there is preferably an additional circlip 123 which is engaged in a locking groove 125 of the pipe socket 29 and thereby forms a snap connection. In the embodiment of the circlip illustrated on the right in FIG. 2, the circlip cannot be removed. The variant of the circlip illustrated on the left in FIG. 2, the circlip can have an actuator tongue 127, the end of which can be introduced into a recess in the housing 101, to prevent any accidental opening of the shutoff valve device 27.

In another possible embodiment of the present invention, the circlip 121 and the circlip 123 can be realized as a retaining ring or similar structure. Further, the end of the actuator tongue 127 can be used to remove the circlip or retaining ring from the locking groove 125 without the need for assembly tools.

It should be noted that the diameter of the magnetic control body, conducting body or guide body 95 and of the set screw 91 may be slightly larger than the outside diameter of the ring-shaped body 71. It should also be noted that the diameter of the actual valve portion of the pilot valve 65 is preferably not larger than the diameter of the first bearing 109 and the emergency operation valve 77 can be realized in the form of a gate valve. Therefore, the armature 69 can be removed from the shutoff valve device 27 without having to open and disassemble the entire valve. The ability to adjust the parts of the pilot valve 65 separately may be simplified, among other things, by the fact that the two clamping means which act on the armature 69 each act on different ends. The stop 85 can be adjusted on the end facing the magnetic coil 67 and the spring support plate 93 can be adjusted on the end facing the main stage valve 37. The outer spring cannot fall out of the shutoff valve device 27, because the control edge 79 acts as a stop.

Figure 4:
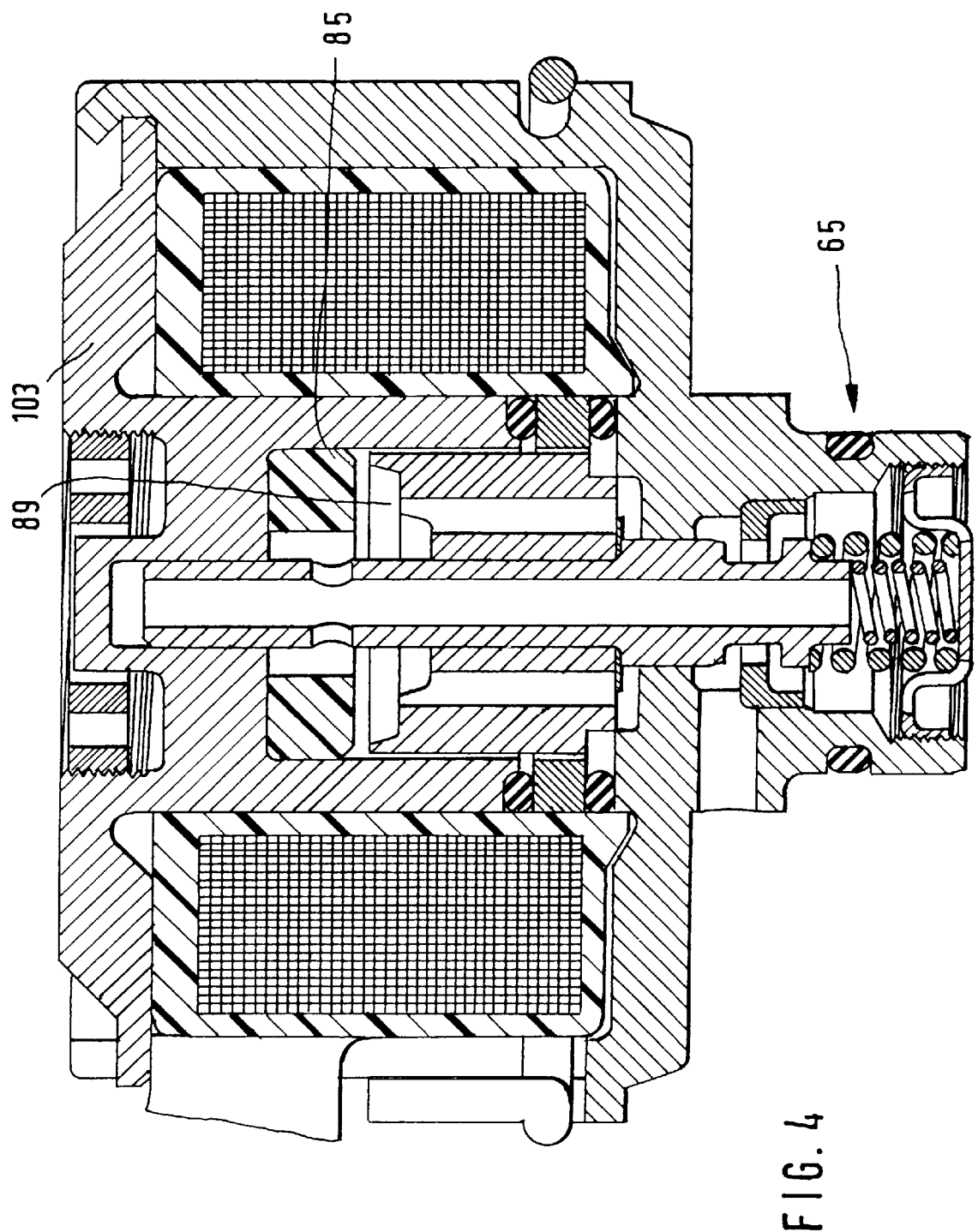
FIG. 4 shows a shutoff valve device with a fixed stop for the emergency operating position.

FIG. 4 illustrates an embodiment which is simplified in comparison to the embodiment illustrated in FIG. 2, and in which, instead of a set screw 91, there is a fixed stop 85. The fixed stop 85 can be realized in the form of a spacer ring and cannot be adjusted, but can be modified very easily to a defined height for a specific vehicle model. One advantage of the embodiment illustrated in FIG. 4 over the embodiment illustrated in FIG. 2 is that the cover 103 completely closes the armature reaction chamber 89. The cover 103 can also include the area which is otherwise covered by the set screw 91. Consequently, no stop seal or gasket 87 like the one in FIG. 2 may be required. The adjustability regarding the normal operation of the pilot valve 65 and of the magnetic control body 95 can be altogether identical with the function as explained in relation to FIG. 2.

Figure 5:
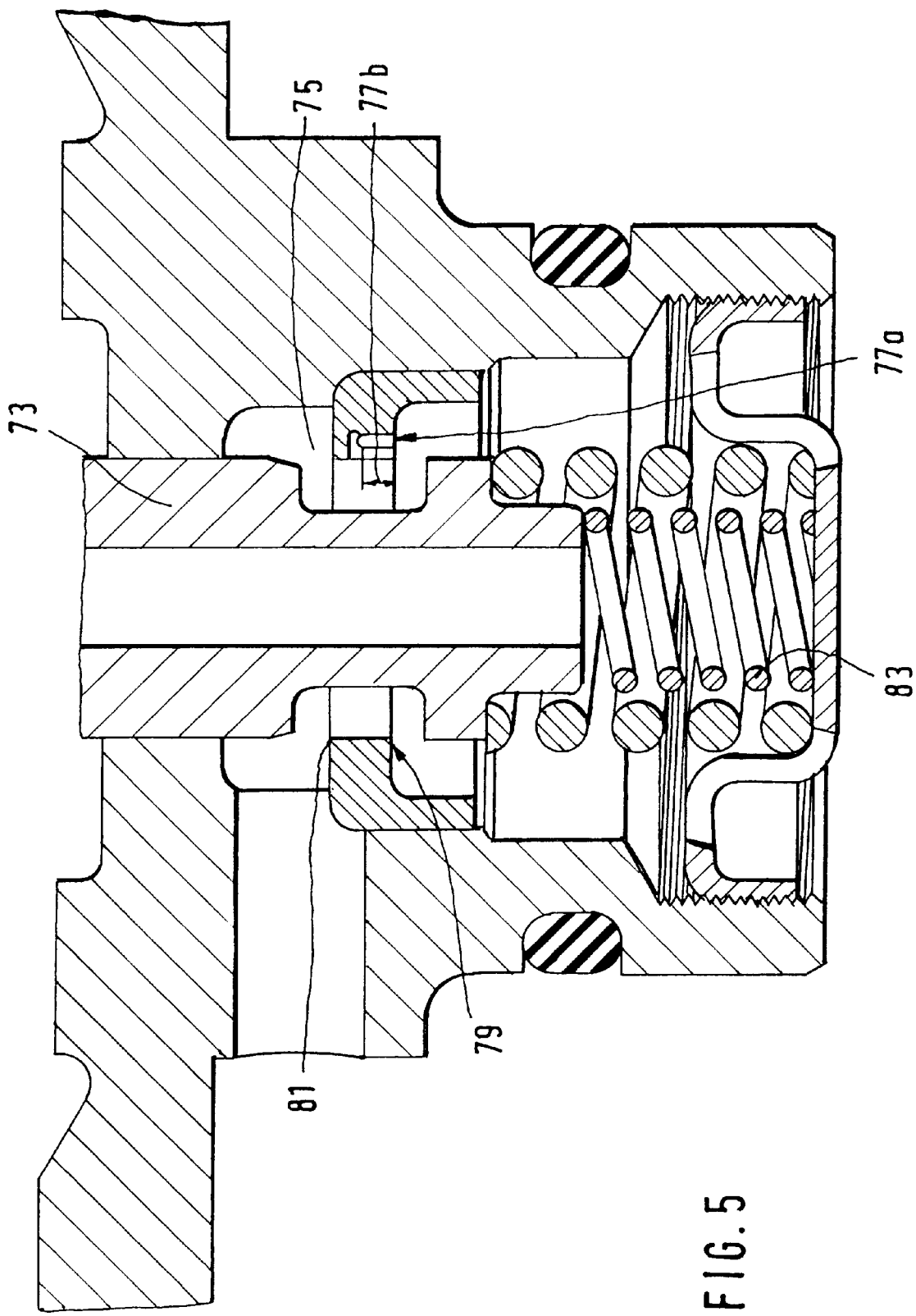
FIG. 5 shows a pilot stage valve with an emergency operating position which is independent of the travel.

FIG. 5 shows a detail from FIGS. 3 or 4, because this configuration of the cross section for the emergency operating setting is independent of the type of stop for the armature 69. The control edge 79, together with the tubular body of the armature 69, can represent a shutoff valve which is realized in the form of a gate valve. As soon as the weaker spring of the spring set 83 has pushed the armature 69 into the emergency operating position, the armature 69 can overlap the control edge 79, so that this flow path is blocked. There is an emergency operating constant throttle 77a, the cross section of which can be smaller than the adjacent cross section of the emergency operation constant throttle on the control edge 81 of the normal operation valve part 75. The major advantage of this solution for emergency operation is that the unavoidable manufacturing tolerances of the valve parts 75, 77 can be compensated for, because the overlap from the control edge 79 to the outlet of the emergency operating constant throttle 77a is available as the equalization distance 77b.

In other words and in accordance with one possible embodiment of the present invention, the spring set 83 can push the emergency operation valve part 77 into contact with the control edge 79 to preferably block the flow path between the emergency operation valve part 77 and the control edge 79. However, flow can occur through the emergency operating constant throttle 77a. The cross section of the emergency operating constant throttle 77a is preferably less than the cross section between the normal operation valve part 77 and the control edge 81.

Figure 6:
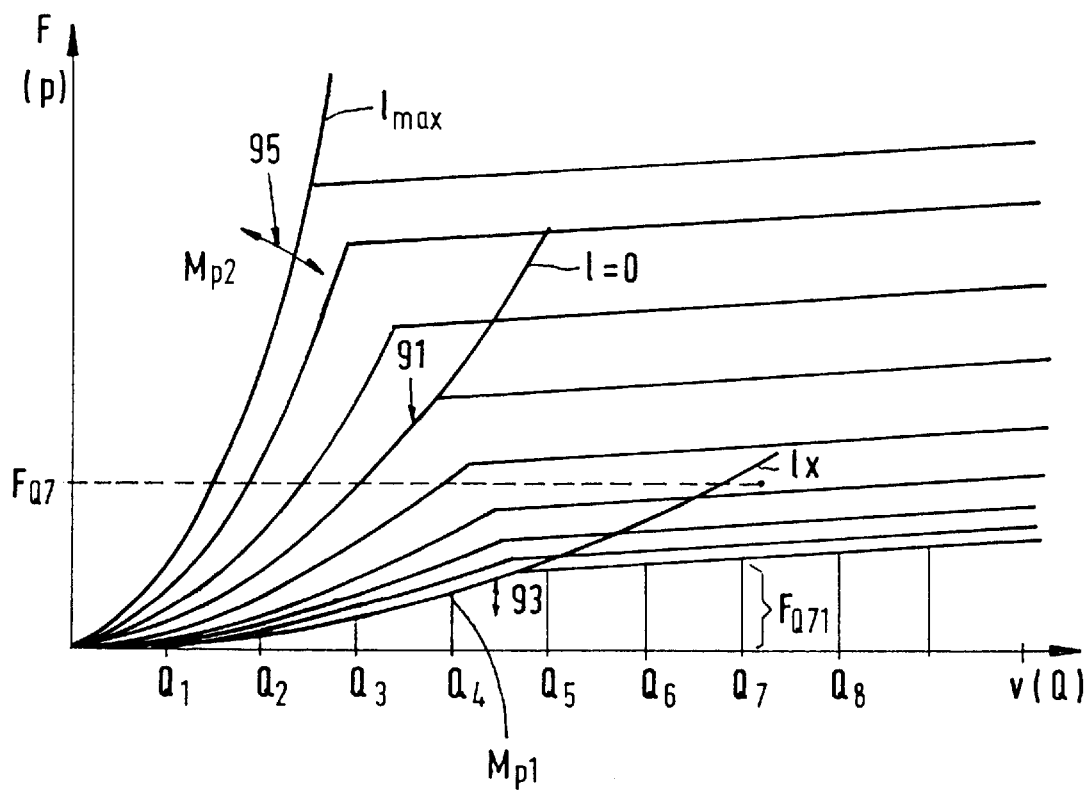
FIG. 6 shows the damping force characteristic of the shutoff valve device.

FIG. 6 illustrates the influence of the settings on the damping force characteristics. The family of damping force characteristics illustrated can be typical for the shutoff valve device 23. The area from the origin of the characteristic to the salient points is influenced by the pilot valve 65. During the calibration of the pilot valve 65, the measurement points Q/p which are significant for the desired setting are preferably specified at a low flow and at a high flow. Then the measurement point $M_{P1}$ is verified. If the measured value is above or below the desired characteristic, the measurement point can be raised or lowered by axially displacing the spring support plate 93 with reference to the specified Q-value, or for a given p-value the measurement point can be displaced parallel to the ordinate. All the pilot characteristics can be influenced in this manner. It can occur that the measurement point $M_{P2}$ exhibits an excessive dynamic effect at $I_{max}$. By loosening the magnetic control body 95, the magnetic flux and thus the effect of the force on the armature 69 can be reduced. Thus a dislocation, separation or offset of the measurement point from the change of direction can be achieved, as likewise for the setting of the spring support plate 93. The displacement of the various characteristics may be different as a function of the current or flow values of the individual pilot stage characteristics. In theory, when there is a high flow, the change of the pilot stage characteristic will be more significant than with a characteristic at a lower flow. Consequently, the magnetic control body 95 can be used to achieve a spreading of the overall range of the pilot stage characteristic. This type of adjustment between the magnetic control body 95 and the spring support plate 93 may have to be repeated, because these two settings have an influence on one another.

After the settings for normal operation have been completed, the emergency operating setting can be accomplished by turning the set screw 91. For this purpose, the stop 85 can be displaced by means of the set screw 91 until the desired characteristic is achieved. This characteristic can be set as desired, e.g. a medium characteristic, but it is also possible to set a characteristic which tends toward the hard or soft direction.

The designation I=O within the characteristic should not be any cause for concern, because the characteristic I=O can naturally also be achieved by the normal operation valve part 75. It should be noted that the characteristic is then produced by various valve parts within the pilot valve part. The setting I=O has no influence on the flow-type characteristics.

Figure 7:
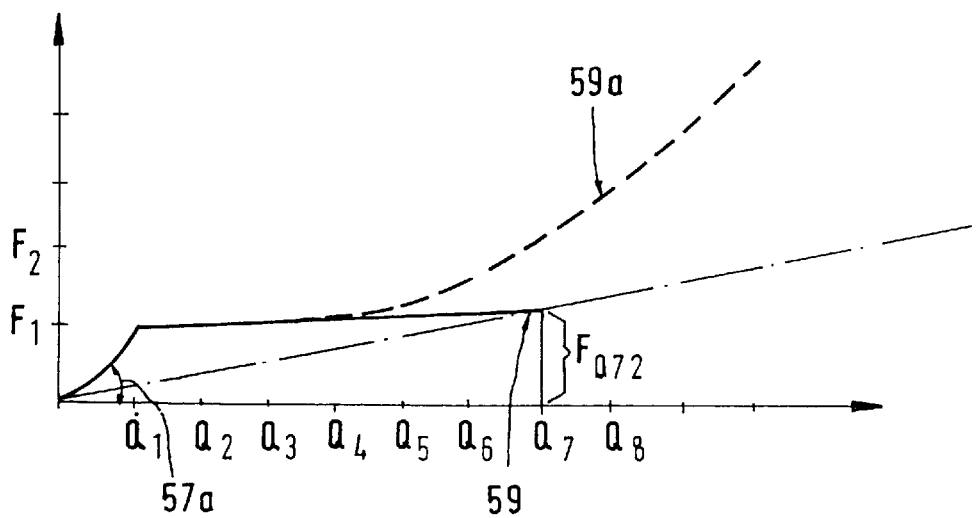
FIG. 7 shows the damping force characteristic of the admission valve.

FIG. 7 shows damping force characteristics of the admission valve 55 which can be realized independently of the main stage valve 37. A very variable damping characteristic can be achieved by means of an appropriate configuration. For example, the influence of the pilot cross section 57a can be clearly pronounced, whereby the slope can be kept flatter by a correspondingly larger opening. The portion of the characteristic represented by the pilot cross section 57a can be followed by a rather degressive branch of the characteristic. This part of the characteristic can be dependent solely on the type of bias of the valve discs 59, and on the characteristic of the valve disc 59, if the valve disc 59 is designed in the form of a spring plate. If necessary, of course, it can also be possible to achieve a linear characteristic if the pilot stage cross section 57a is omitted and the valve disc 59 is practically flat. The characteristic indicated by the broken line illustrates the influence of the pre-throttle or pilot throttle disc 59a, which results in a greater increase of the damping force at higher flow velocities.

The admission valve 55 and the main stage valve 37 may be hydraulically connected in series. Consequently, it can be possible to simulate or modulate the main stage valve 37 very accurately. The effect achieved by the series connection is easy to predict, by preparing a desired characteristic field of the shutoff valve device 27 and entering the characteristic field of the main stage valve 37 and of the pilot valve 65 in this characteristic field. The differences in damping force must be produced by the admission valve 55. By way of example, the reverse path can be illustrated in FIGS. 5 and 6 at a point with the volume flow $Q_7$. The volume flow $Q_7$ in FIG. 6 can result in the damping force amount F With the same volume flow, and with the admission valve 55, we can get the damping force amount $F_{Q72}$. The simple addition of the two individual damping force amounts then gives the joint damping force amount $F_{Q7}$ as illustrated in FIG. 6. The use of the admission valve 55 can always be particularly beneficial if the characteristic damping force curves of the pilot valve 65 and of the main stage valve 37 do not meet the requirements, i.e. if, as a rule, a specified damping force value is not reached. For example, there can be a requirement for relatively flat main stage characteristics, but particularly at large flow volumes $Q_X$ a larger damping force must preferably be produced, e.g. to prevent wheel shudder or shimmy. Frequently, a somewhat greater damping force can be desired in the characteristic range of the pilot valve 65. In this case, the damping force characteristic illustrated in FIG. 7 can be very effectively used, because it results in an increase in the damping force precisely at low volume flows, but otherwise increases or raises the characteristic uniformly.

It must be borne in mind that the admission valve 55 can make it possible to achieve a harder damping force characteristic without a greater flow to the magnet coil or solenoid 67. The steeper the characteristic of the pilot valve 65 must be, the greater must be the flow to the magnet coil 67, because the greater flow to the magnet coil 67 results in a closing movement of the pilot valve 65.

One feature of the invention resides broadly in the damping valve comprising a cylinder filled with damping medium in which a piston rod with a piston is realized so that the piston rod can move axially, whereby the piston divides the cylinder into two working chambers, whereby the damping valve is located inside a housing and is realized so that it can be adjusted by means of a solenoid or magnet coil in connection with an armature guided in an insulator, whereby a receptacle functions as part of the housing, which receptacle, by means of an insulator, separates the hydraulic part of the damping valve from the electrical part, and a tube socket, which together with the housing holds the adjustable damping valve, characterized by the fact that as the insulator at least one gasket or seal 113a is used, which provides hydraulic and magnetic insulation between a cover 103 of the housing 101 and the receptacle 105.

Another feature of the invention resides broadly in the damping valve characterized by the fact that when the housing is assembled, the cover of the housing can be rotated relative to the tube socket 29, by opening and closing a locking connection between the housing and the tube socket as desired.

Yet another feature of the invention resides broadly in the damping valve characterized by the fact that the receptacle 105 for the solenoid 67 is realized in a cup shape.

Still another feature of the invention resides broadly in the damping valve characterized by the fact that the locking connection consists of a circlip 123 which is engaged under a radial bias in a locking groove 125.

A further feature of the invention resides broadly in the damping valve characterized by the fact that the circlip 123 has at least one actuator tab 127, the end of which can be introduced into a recess of the housing, so that the circlip can be moved out of the locking groove.

Another feature of the invention resides broadly in the damping valve characterized by the fact that the cover 103 has an inwardly pointing sleeve segment 115 which functions as the magnetic return path body for the magnetic flux inside the housing 101, whereby the sleeve segment is in contact with the insulator 113.

Yet another feature of the invention resides broadly in the damping valve characterized by the fact that between the sleeve segment 115 and the armature 71; 73 there is a gap 71a which is larger than the clearance between the armature and its bearings 109, 111 inside the housing 101.

Still another feature of the invention resides broadly in the damping valve characterized by the fact that the cover 103 is at least partly connected in a form-fitting manner with the receptacle 105.

A further feature of the invention resides broadly in the damping valve characterized by the fact that the cover is fixed to the receptacle 105 by means of a circlip 121.

Another feature of the invention resides broadly in the damping valve characterized by the fact that the insulator consists of a series arrangement of a second gasket 113a in connection with an insulator 113b and a first gasket 113c.

Yet another feature of the invention resides broadly in the damping valve characterized by the fact that the solenoid 67 has a contact surface with the receptacle 105 which is offset relative to the insulator 113b.

Still another feature of the invention resides broadly in the damping valve characterized by the fact that the offset of the contact surfaces between the insulator 113b and the receptacle 105 relative to the solenoid is achieved by an extension 67a of the solenoid 67.

Examples of adjustable hydraulic vibration dampers with damping valves which may possibly be utilized or adapted for use in the context of the present invention may be disclosed in the following patents: U.S. Pat. No. 4,635,765, entitled "Adjustable Hydraulic Damper Apparatus"; U.S. Pat. No. 4,650,042, entitled "Hydraulic Adjustable Shock Absorber"; U.S. Pat. No. 4,723,640, entitled "Adjustable Hydraulic Vibration Damper"; U.S. Pat. No. 4,785,920, entitled "Hydraulic Adjustable Shock Absorber"; U.S. Pat. No. 4,850,460, entitled "Hydraulic Adjustable Shock Absorber"; U.S. Pat. No. 5,265,703, entitled "Adjustable Hydraulic Vibration Damper for Motor Vehicles"; U.S. Pat. No. 5,301,776, entitled "Hydraulic Adjustable Vibration Damper"; U.S. Pat. No. 5,335,757, entitled "Hydraulic Adjustable Vibration Damper"; U.S. Pat. No. 5,392,885, entitled "Adjustable Hydraulic Vibration Damper for Motor Vehicles"; U.S. Pat. No. 5,435,421, entitled "Hydraulic Adjustable Vibration Damper and a Valve System for a Hydraulic, Adjustable Vibration Damper" and U.S. Pat. No. 5,558,189, entitled "Adjustable Hydraulic Vibration Damper".

Examples of seals and insulator arrangements which may possibly be utilized or adapted for use in the context of the present invention may be disclosed in the following patents: U.S. Pat. No. 5,290,611, entitled "Insulative Spacer/Seal System"; U.S. Pat. No. 4,911,972, entitled "Insulating Composite Gasket"; U.S. Pat. No. 4,879,518, entitled "Linear Particle Accelerator with Seal Structure between Electrodes and Insulators"; U.S. Pat. No. 4,371,588, entitled "Electrical Insulating Material with Hermetic Seal"; U.S. Pat. No. 4,335,273, entitled "Electrically Insulating Seal Assembly"; and U.S. Pat. No. 4,015,634, entitled "Split-Sleeve Pipe Device with Integral Seal and Insulator".

U.S. patent application, Ser. No. 08/879,014, filed on or about Jun. 20, 1997, and claiming priority from German Application Numbers 196 24 897.3, DE-OS 196 24 897.3 and DE-PS 196 24 897.3 filed on Jun. 21, 1996, and having Attorney Docket No. NHL-FIS-295, and having inventor Andreas Förster and having the title "A Vibration Damper and a Damping Valve with Adjustable Damping Force for a Vibration Damper" is hereby incorporated by reference as if set forth in its entirety herein.

U.S. patent application, Ser. No. 08/878,721, filed on or about Jun. 20, 1997, and claiming priority from German Application Numbers 196 24 895.7, DE-OS 196 24 895.7 and DE-PS 196 24 895.7 filed on Jun. 21, 1996, and having Attorney Docket No. NHL-FIS-296, and having inventor Andreas Förster and having the title "Vibration Damper, such as for a Motor Vehicle, with Adjustable Damping Force" is hereby incorporated by reference as if set forth in its entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A vibration damper for a motor vehicle, said vibration damper comprising:

a cylinder;

hydraulic damping fluid;

said cylinder being configured to contain said hydraulic damping fluid;

said cylinder comprising a first end and a second end;

said first end of said cylinder being configured and disposed to operatively connect to a first part of a motor vehicle;

said second end of said cylinder being disposed opposite said first end of said cylinder;

a piston rod;

said piston rod sealingly projecting into said second end of said cylinder;

said piston rod comprising a first end and a second end;

said first end of said piston rod being configured and disposed to operatively connect to a second part of a motor vehicle;

said second end of said piston rod being disposed opposite said first end of said piston rod;

a piston;

said piston being disposed on said second end of said piston rod;

said piston being configured and disposed to slide within said cylinder;

said piston being configured and disposed to divide said cylinder into a first chamber and a second chamber;

an electromagnetic valve;

said electromagnetic valve being configured and disposed to control flow of said hydraulic damping fluid from at least one of said first chamber and said second chamber;

said electromagnetic valve comprising a magnetic path to permit passage of magnetic flux in said electromagnetic valve;

said magnetic path comprising a stator structure;

said stator structure comprising a magnetic coil to generate magnetic flux upon application of electrical current to said electromagnetic valve;

said magnetic path comprising an armature structure;

said armature structure being configured and disposed to be moved by magnetic flux generated by said magnetic coil of said stator structure to control flow of said hydraulic damping fluid through said electromagnetic valve;

said stator structure comprising a cover member;

said cover member comprising a first member;

said cover member comprising a second member;

said armature structure being configured and disposed to permit passage of magnetic flux between said first member and said second member through said armature structure;

said electromagnetic valve comprising a magnetic and hydraulic insulator arrangement;

said magnetic and hydraulic insulator arrangement being disposed between said first member and said second member;

said magnetic and hydraulic insulator arrangement being configured to direct passage of magnetic flux between said first member and said second member through said armature structure and to minimize direct passage of magnetic flux between said first member and said second member;

said magnetic and hydraulic insulator arrangement comprising at least one seal; and said at least one seal of said magnetic and hydraulic insulator arrangement being configured to seal said hydraulic damping fluid from entering said magnetic coil of said stator structure.

2. The vibration damper according to claim 1, wherein: said at least one seal comprises an O-ring.

3. The vibration damper according to claim 2, wherein: said vibration damper comprises a housing member;

said housing member is configured and disposed to partially enclose said electromagnetic valve;

said housing member is operatively connected to said cylinder;

said cover member is disposed to contact said housing member; and said cover member is configured and disposed to be rotatable with respect to said housing member.

4. The vibration damper according to claim 3, wherein: said electromagnetic valve comprises a connection device;

said connection device is configured and disposed to connect said cover member to said housing member; and said cover member is rotatable upon adjustment of said connection device to disconnect said cover member from said housing member.

5. The vibration damper according to claim 4, wherein: said electromagnetic valve has a longitudinal axis;

said magnetic coil comprises a solenoid;

said solenoid is disposed about said longitudinal axis;

said solenoid is disposed to be at least partially enclosed by said cover member;

said solenoid is configured to generate magnetic flux upon application of electrical current to said solenoid;

said second member comprises a first surface and a second surface;

said first surface of said second member is disposed to contact said solenoid;

said second surface of said second member is disposed to contact said insulator arrangement; and said first surface of said second member is offset a substantial axial distance from said second surface of said second member.

6. The vibration damper according to claim 5, wherein: said second member comprises a groove;

said groove of said second member is disposed adjacent to said solenoid;

said groove of said second member comprises said first surface of said second member;

said solenoid comprises an extended portion; and said extended portion of said solenoid is configured and disposed to project into said groove of said second member and to contact said first surface of said second member.

7. The vibration damper according to claim 6, wherein: said at least one seal is deformable upon application of pressure to said at least one seal; and said first surface and said second surface of said second member are configured and disposed to be axially offset to minimize deformation of said at least one seal between said solenoid and said second member.

8. The vibration damper according to claim 7, wherein: said first member comprises a segment;

said segment is substantially sleeve-shaped;

said segment of said first member is disposed along said longitudinal axis between said armature structure and said solenoid; and said segment of said first member is disposed to contact said insulator arrangement.

9. The vibration damper according to claim 8, wherein: said armature structure comprises an armature; and said insulator arrangement is configured and disposed to guide movement of said armature.

10. The vibration damper according to claim 9, wherein: said at least one seal comprises a first seal and a second seal;

said first seal is disposed to contact said segment of said first member; and said second seal is disposed to contact said second surface of said second member.

11. The vibration damper according to claim 10, wherein: said insulator arrangement comprises an insulator member;

said insulator member is configured to limit passage of magnetic flux through said insulator member; and said insulator member is disposed between said first seal and said second seal.

12. The vibration damper according to claim 11, wherein said second member is configured in the shape of a tube, said tube having one substantially closed end.

13. The vibration damper according to claim 12, wherein:

said housing member comprises a groove;

said connection device comprises a retaining ring, said retaining ring is configured to have a radial bias; and said retaining ring is configured and disposed to engage said groove of said housing member with said radial bias to connect said housing member to said cover member.

14. The vibration damper according to claim 13, wherein:

said retaining ring comprises at least one tab;

said cover member comprises at least one recess;

said at least one tab of said retaining ring is disposed within said at least one recess of said cover member; and said at least one tab is configured and disposed to disengage said retaining ring from said groove of said housing member.

15. The vibration damper according to claim 14, wherein:

said armature structure comprises a shaft body;

said shaft body is disposed along said longitudinal axis;

said shaft body comprises a first end and a second end;

said electromagnetic valve comprises a first bearing and a second bearing;

said first bearing is disposed adjacent to said first member;

said first bearing is configured and disposed to guide movement of said first end of said shaft body;

said second bearing is disposed adjacent to said second member; and said second bearing is configured and disposed to guide movement of said second end of said shaft body.

16. The vibration damper according to claim 15, wherein:

said first member comprises a first connecting portion;

said second member comprises a second connecting portion; and said first connecting portion and said second connecting portion are configured and disposed to together form a connection between said first member and said second member.

17. The vibration damper according to claim 15, wherein:

said segment is disposed a first radial distance from said armature to form a first gap between said segment and said armature;

said first bearing is disposed a second radial distance from said first end of said shaft body to form a second gap between said first end of said shaft body and said first bearing;

said second bearing is disposed a third radial distance from said second end of said shaft body to form a third gap between said second end of said shaft body and said second bearing;

said second radial distance is substantially equal to said third radial distance;

said first radial distance is substantially greater than both of said second radial distance and said third radial distance;

said electromagnetic valve comprises a control body;

said control body is disposed adjacent to said first member;

said control body comprises a threaded portion;

said first member comprises a threaded portion;

said threaded portion of said control body is configured and disposed to be threaded into said threaded portion of said first member to permit adjustment of said control body; and said control body is configured and disposed to at least partially control magnetic flux generated by said solenoid.

18. The vibration damper according to claim 15, wherein:

said retaining ring is a first retaining ring;

said electromagnetic valve comprises a second retaining ring; and said second retaining ring is configured and disposed to connect said first member to said second member.

19. The vibration damper according to claim 18, further comprising:

a first tube;

said first tube being disposed about said cylinder;

said first tube and said cylinder being configured and disposed to form a third chamber;

said third chamber being configured to contain said hydraulic damping fluid;

a second tube;

said second tube being disposed about said first tube;

said second tube and said first tube being configured and disposed to form a fourth chamber;

said fourth chamber being configured to contain said hydraulic damping fluid;

said first chamber being disposed adjacent to said first end of said cylinder;

said second chamber being disposed adjacent to said second end of said cylinder;

said second end of said cylinder comprising an opening to permit flow of said hydraulic damping fluid between said second chamber and said third chamber;

said fourth chamber being configured and disposed to receive said hydraulic damping fluid from said electromagnetic valve;

said piston comprising a first valve apparatus;

said first valve apparatus being configured and disposed to permit flow of said hydraulic damping fluid between said first chamber and said second chamber;

said first end of said cylinder comprising a second valve apparatus;

said second valve apparatus being configured and disposed to permit flow of said hydraulic damping fluid between said fourth chamber and said first chamber;

said second end of said cylinder comprising a guiding arrangement;

said guiding arrangement being configured and disposed to guide movement of said piston rod in said cylinder;

a third valve apparatus;

said third valve apparatus being disposed adjacent to said third chamber;

said third valve apparatus being configured to control flow of said hydraulic damping fluid through said third valve apparatus;

said third valve apparatus being configured and disposed to connect to said electromagnetic valve to permit flow of said hydraulic damping fluid from said third chamber into said electromagnetic valve;

said third valve apparatus comprising:

a plurality of channels;

said plurality of channels being configured and disposed to permit flow of said hydraulic damping fluid through said third valve apparatus;

a plurality web portions;
said plurality of web portions being disposed between two adjacent channels of said plurality of channels;
at least one valve disc;
said at least one valve disc being configured and disposed to control flow of said hydraulic damping fluid from said third valve apparatus;
a throttle member; and
said throttle member being configured and disposed to throttle flow of said hydraulic damping fluid into said third valve apparatus from said third chamber; said housing member being connected to said second tube; said housing member being configured to at least partially enclose said third valve apparatus; and
said electromagnetic valve comprising:
a passageway;
said passageway being configured and disposed to permit flow of said hydraulic damping fluid into said fourth chamber from said electromagnetic valve;
said passageway having a cross-section;
said second end of said shaft body being configured to adjust said cross-section of said passageway upon movement of said shaft body to control flow of said hydraulic damping fluid through said electromagnetic valve;
a spring arrangement;
said spring arrangement being configured and disposed to oppose movement of said armature structure by magnetic flux;
a spring plate;
said spring plate being disposed adjacent to said second member;
said spring plate being configured and disposed to adjust bias of said spring arrangement;
a stop member;
said stop member being displaceable along said longitudinal axis;
said stop member being configured and disposed to limit movement of said armature structure by said spring arrangement;
a set screw;
said set screw being configured and disposed to displace said stop member;
a valve body;
said valve body being disposed between said third valve apparatus and said second end of said shaft body; and
said valve body comprising a hole to permit flow of said hydraulic damping fluid from said third valve apparatus to said passageway.

20. The vibration damper according to claim 18, further comprising:
a first tube;
said first tube being disposed about said cylinder;
said first tube and said cylinder being configured and disposed to form a third chamber;
said third chamber being configured to contain said hydraulic damping fluid;
a second tube;
said second tube being disposed about said first tube;
said second tube and said first tube being configured and disposed to form a fourth chamber;
said fourth chamber being configured to contain said hydraulic damping fluid;
said first chamber being disposed adjacent to said first end of said cylinder;

said second chamber being disposed adjacent to said second end of said cylinder;
said second end of said cylinder comprising an opening to permit flow of said hydraulic damping fluid between said second chamber and said third chamber;
said fourth chamber being configured and disposed to receive said hydraulic damping fluid from said electromagnetic valve;
said piston comprising a first valve apparatus;
said first valve apparatus being configured and disposed to permit flow of said hydraulic damping fluid between said first chamber and said second chamber;
said first end of said cylinder comprising a second valve apparatus;
said second valve apparatus being configured and disposed to permit flow of said hydraulic damping fluid between said fourth chamber and said first chamber;
said second end of said cylinder comprising a guiding arrangement;
said guiding arrangement being configured and disposed to guide movement of said piston rod in said cylinder;
a third valve apparatus;
said third valve apparatus being disposed adjacent to said third chamber;
said third valve apparatus being configured to control flow of said hydraulic damping fluid through said third valve apparatus;
said third valve apparatus being configured and disposed to connect to said electromagnetic valve to permit flow of said hydraulic damping fluid from said third chamber into said electromagnetic valve;
said third valve apparatus comprising:
a plurality of channels;
said plurality of channels being configured and disposed to permit flow of said hydraulic damping fluid through said third valve apparatus;
a plurality web portions;
said plurality of web portions being disposed between two adjacent channels of said plurality of channels;
at least one valve disc;
said at least one valve disc being configured and disposed to control flow of said hydraulic damping fluid from said third valve apparatus;
a throttle member; and
said throttle member being configured and disposed to throttle flow of said hydraulic damping fluid into said third valve apparatus from said third chamber; said housing member being connected to said second tube; said housing member being configured to at least partially enclose said third valve apparatus; and
said electromagnetic valve comprising:
a passageway;
said passageway being configured and disposed to permit flow of said hydraulic damping fluid into said fourth chamber from said electromagnetic valve;
said passageway having a cross-section;
said second end of said shaft body being configured to adjust said cross-section of said passageway upon movement of said shaft body to control flow of said hydraulic damping fluid through said electromagnetic valve;
a spring arrangement;
said spring arrangement being configured and disposed to oppose movement of said armature structure by magnetic flux;

a spring plate;

said spring plate being disposed adjacent to said second member;

said spring plate being configured and disposed to adjust bias of said spring arrangement;

a stop member;

said stop member being displaceable along said longitudinal axis;

said stop member being configured and disposed to limit movement of said armature structure by said spring arrangement;

a set screw;

said set screw being configured and disposed to displace said stop member;

a valve body;

said valve body being disposed between said third valve apparatus and said second end of said shaft body; and said valve body comprising a hole to permit flow of said hydraulic damping fluid from said third valve apparatus to said passageway.

* * * * *